United States Patent Office 3,784,573
Patented Jan. 8, 1974

3,784,573
CATALYSIS OF TRANS-ACIDOLYSIS REACTION
Ellis K. Fields, River Forest, and Imre Puskas, Chicago, Ill., assignors to Standard Oil Company, Chicago, Ill.
No Drawing. Filed Aug. 13, 1970, Ser. No. 63,622
Int. Cl. C07c 69/76
U.S. Cl. 260—346.3
6 Claims

ABSTRACT OF THE DISCLOSURE

This invention is directed to a trans-acidolysis reaction wherein a lower alkanoic ester of an alcohol is reacted with trimellitic anhydride in the presence of an effective amount of a tertiary amine having a $pK_b$ not exceeding 10.

---

This invention relates to the use of new catalysts in trans-acidolysis reactions. The reaction can be illustrated, using monofunctional reactants, by the following equation:

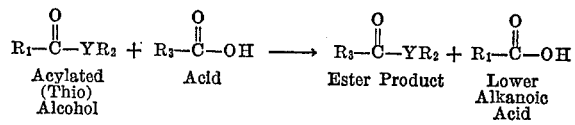

| $R_1-\overset{O}{\underset{\|}{C}}-YR_2$ + $R_3-\overset{O}{\underset{\|}{C}}-OH$ | → | $R_3-\overset{O}{\underset{\|}{C}}-YR_2$ + $R_1-\overset{O}{\underset{\|}{C}}-OH$ |
|---|---|---|
| Acylated (Thio) Alcohol | Acid | Ester Product    Lower Alkanoic Acid | where Y is oxygen or sulfur.

We have discovered that the trans-acidolysis reaction between carboxylic acids and lower alkanoic acid esters of organic hydroxy or mecapto compounds (also referred to collectively hereinafter as "alcohols") is catalyzed by certain bases. The bases that we have found effective are the hydroxides and acetates of Group Ia and IIa metals of the periodic table. The active species in these compounds is the anion and we have found that such anions are effective for catalyzing the reaction between broad classes of both carboxylic acids and lower alkanoic acid esters of hydroxy- or mercapto-compounds. In contrast to the broad efficacy of these anionic catalysts, we have also discovered certain tertiary-nitrogen compounds whose catalysts is specific to trans-acidiolysis reactions involving only trimellitic acid or its anhydride.

Any base anion can be used and will be broadly applicable to trans-acidolysis reactions—i.e. these anionic catalysts will not be specific to only certain narrow classes of co-reactants—so long as they are derived from acids whose dissociation constants are less than $10^{-4}$. Particularly effective catalysts of this type are the alkali and alkaline earth hydroxides and their acetates. Such catalysts include sodium hydroxide, potassium hydroxide, lithium hydroxide, magnesium hydroxide, sodium acetate, potassium acetate. While the anhydrous salt of these catalysts are effective, we have also found that their hydrated forms possess enhanced catalytic properties. This can be seen by comparing the performance of anhydrous sodium acetate with its trihydrate and the monohydrate of calcium acetate with the tetrahydrate of magnesium acetate in Table 2.

As pointed out above, the anionic catalysts of this invention are effective over a broad range of co-reactants. Generally the prior art has utilized trans-acidolysis in the synthesis of monoesters, diesters, triesters and long chain polyesters suitable for fiber and film applications. The anionic catalysts of this invention are suitable for each of these applications. Heretofore when these important trans-acidolyses were carried out, either in the absence of catalysts or with less effective catalysts than those of the present invention, besides the longer reaction time per se being disadvantageous, the prolonged exposure to reaction temperatures degraded the products, frequently causing severe discoloration. One expedient adopted to ameliorate the problem was to conduct the reaction in a solvent which, while not preventing the discoloration, facilitated the separation of the discolored products. Using either of our catalysts types, these reactions are so rapid that high yields can be obtained without discoloration. This, in turn, permits our reaction to be run in the absence of solvent, thus making our process comparatively inexpensive vis-a-vis raw material cost and solvent-processing costs.

Where the desired product is a monoester, the monobasic carboxylic acid susceptible to our anionic catalysis may be a mononuclear aromatic monocarboxylic acid such as benzoic, o-toluic, m-toluic, p-toluic; a fused ring aromatic acid such as 1-naphthoic, 2-napthoic, 1-napthyl-acetic, beta-1-napthyl-propionic acid, 1- and 2-napthyacrylic acids; anthracene-1-carboxylic acid, anthracene-2-carboxylic acid, etc. Among the aliphatic acids suitable are the alkanoic acids such as propionic, n-butyric, n-valeric and higher homologues such as capric, stearic, and melissic. Alkenoic acids may be used, having mono- or poly-unsaturation, such as acrylic, 9-octadecenoic, 9,12-octadecadienoic, 9,12,15-octadecatrieneoic, 13-docosenoic and the like. Cycloalkanoic and cycloalkenoic acids are useful and include cyclohexane carboxylic, tetrahydrobenzoic, decahydronaphthoic and cyclohexaneacetic.

The anionic catalysts of the present invention also promote the reaction between those co-reactants known by the prior art to be useful in preparing polyanhydrides. The carboxylic acids used therein are tricarboxylic acids and include trimellitic anhydride, trimellitic acid, 1,2,4-naphthalene tricarboxylic acid, 1,4,8-naphthalene tricarboxylic acid, 1,2,4-butane, tricarboxylic acid, 1,2,3-benzene tricarboxylic acid, 1,2,3-propane tricarboxylic acid and 2,3,6-naphthalene tricarboxylic acids and their corresponding anhydrides.

The anionic catalysts of the present invention are further useful in catalyzing the trans-acidolysis reaction between co-reactants useful in the preparation of long-chain polyesters. Useful acids include both aliphatic and aromatic dicarboxylic acids. Illustrative of these are alkanedioic acids, alkenedioic acids and aromatic dicarboxylic acids. Exemplary of the alkanedioic acids are oxalic, malonic, succinic, glutaric, adipic, and higher homologues such as sebacic; among the alkenedioic acids are maleic and fumaric. The aromatic acids include: o-phthalic, isophthalic, terephthalic; the homophthalic or carboxy-phenylacetic acids such as o-carboxy-phenylacetic, m-carboxy-phenylacetic, p-carboxy-phenylacetic; and the phenylene-diacetic acids such as o-, m-, p-phenylenediacetic, o-phenyleneacetic-propionic, o-, m-, p-phenylenedipropionic, and p-phenylenediisobutyric acid.

The second co-reactant useful in our trans-acidolysis reactions is a lower alkanoic acid ester of a hydroxide- or mercapto-containing compound. These lower alkanoic acids and their use in trans-acidolysis processes are well known to the art. Since they are reformed in the course of the trans-acidolysis reaction as unwanted by-products the preferred lower alkanoic acids are those with low boiling points, which property facilitates their removal by distillation. Such acids include formic, acetic, propionic, butyric, benzoic, and the like. These acids are used to acylate the alcohols of the present invention. Again, the selection of the type of alcohol will depend on whether the end product of the trans-acidolysis reaction desired is a monoester, diester, etc. When a monoester is desired any monoalkanol or its corresponding thio-counterpart may be used. Primary, secondary and tertiary alcohols may be used although primary alcohol is preferred. Among the saturated monohydric alcohols that are useful are n-butyl, isobutyl, sec-butyl, and higher members of the series such as n-myristyl and n-stearyl; corresponding alkenols are likewise useful. The aromatic compounds phenol and thiophenol may be used and are included, for the purpose of describing our invention, in the term "alcohol."

Polyalcohols useful in the present invention have the following general formula:

$$R-(Y)_n$$

where Y is —OH or —SH; $n$ is 2 to 4; and R is a phenylene radical, a fused, carbocyclic with 4 rings or less, a biphenyl, a terphenyl, a bis-phenylene, or a straight chain aliphatic radical. Among the useful polyalcohols containing the phenylene radical are hydroquinone, resorcinol; providing the fused carbocyclic structure are such compounds as dihydroxy naphthalene, trihydroxy naphthalene and dihydroxy anthracene; dihydroxy biphenyl typifies the bi-phenyl compounds. The bis-phenylene radicals have the following structures:

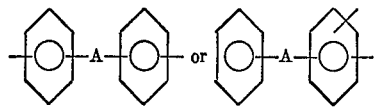

where A is any of the following divalent radicals: $C_1$–$C_3$ alkylene, sulfonyl, carbonyl, thio or oxy. Dihydroxy compounds providing the above bis-phenyl structure include dihydroxybenzophenone; 4,4' - isopropylidenediphenol (Bisphenol A; 4,4'-isobutylidenediphenol (Bisphenol B); 4,4'-isopropylidenedi(o-cresol) (Bisphenol C); p,p'-methylenebiphenol.

The R group of the polyalcohol may also be an aliphatic radical. Exemplary of such compounds would be a glycol such as ethylene glycol, diethylene glycol, polyethylene glycol, neopentyl glycol, 1,6-hexanediol, such higher homologues as 1,20-eiconsanediol and 1,22-docosanediol; and such higher polyhydroxy compounds as glycerol, pentaerythritol and the like. The aliphatic chain may also have ether linkages within it as illustrated by such compounds as the polyether and polyester polyols well known in the urethane foam art.

The tertiary-nitrogen catalysts of the present invention may be any tertiary amine with a $pK_b$ not exceeding about 10.0. Thus useful classes of tertiary amines include aliphatic aralkyl, aryl-alkyl amines and cyclic amines wherein a N-atom is present as part of a ring.

Preferred alipahtic tertiary-amines contain a total of about 10 to 40 carbon atoms. The alkyl or alkenyl groups contributing carbon atoms may be the same or different. Illustrative are methyldioctodecylamine, methyldiisooctylamine, trihexylamine, trioctylamine, n-dodecyl dimethylamine, tetradecyldimethylamine, hexadecyldimethylamine, triisooctylamine, etc.

Illustrative of the aryl-alkyl and aralkylamines are the alkyldiphenylamines, dialkylphenylamines such as dimethylpyridine, and dimethylbenzylamine. Purely aryl-amines such as triphenylamines are not preferred since due to the benzene ring's well-known electron-withdrawing effect, their basicity generally falls outside the required maximum $pK_b$ aforesaid.

Heterocyclic amines of the present invention are unsubstituted or alkyl-substituted monocycles or polycycles. One ring of such amines must contain at least one tertiary N-atom. The rings are 5- or 6-membered. Both aromatic and non-aromatic heterocycles are useful. Other heteroatoms may be present but are limited to oxygen and sulfur.

Illustrative of the monocyclic heterocycles are pyridine, 4-phenylpyridine, methyl pyridines, and monocycles containing two ring-nitrogen atoms such as pyridazine, pyrimidine and pyrizine; and five-membered heterocycles such as N-methylpyrrole and its saturated forms—N-methylpyrroline and N-methyl-pyrrolidine, the N-alkyl-imidazole and its hydrogenated homologues, and N-laurylmorpholine and its alkyl counterparts known commercially as "coconut oil morpholine."

One class of useful polycyclic heterocycles are those having 2–3 rings, each ring being fused (i.e.—condensed nuclei) to at least one other ring. More than one N-atom may be present in the structure in any position relative to other nitrogens whether in the same or different rings. Illustrative of these fused heterocycles are isoquinoline, quinoline, 1,8-naphthyridine, cinnoline, quinoxaline, acridine, phenanthridine, and phenazine.

A second class of polycyclic heterocycle useful as catalysts are the "bi-compounds" such as the bipyridyls.

As pointed out above, while the anionic catalysts of the present invention are effective over a broad range of transacidolysis co-reactants, the tertiary-nitrogen catalysts of the present invention significantly accelerate only those trans-acidolyses wherein the carboxylic acid is trimellitic acid or its anhydride. This can be seen in Table #1.

TABLE 1

| Reaction # | Acid | Acylated alcohol | k (cat.)/ k (uncat.) | Catalyst/ amount [1] |
|---|---|---|---|---|
| 1 | TMA | HDQ | 11.80 | (C₈)₃N/0.5 |
| 2 | TMA | 4-ABP | 6.02 | (C₈)₃N/0.5 |
| 3 | IPA | 4-ABP | 1.09 | (C₈)₃N/0.5 |
| 4 | Naph | 4-ABP | 1.07 | (C₈)₃N/0.5 |
| 5 | TMA | HDQ | [2] 7.49 | IQ/0.5 |
| 6 | Naph | 4-ABP | [2] 1.32 | IQ/2.0 |

[1] Amount is expressed as mole percent based on moles of acid.
[2] Without catalyst #2 reaction is 2.6× the rate of #1 reaction indicating relative reactivity of HDQ vs 4-ABP.

NOTE.—For component codes see Table 2 below.

The catalyzed-transacidolyses reactions of the present invention are, generally speaking, carried out under substantially the same conditions used in the prior art.

Specifically, the mole ratio of the acylated alcohol to the carboxylic acid is not critical to this improved process of transacidolysis. It will depend of course on the type of product desired. Selection of suitable ratios to achieve the various products is well known to the art. Temperatures range from 100–350° C.; higher temperatures, say 280–300° C., being most preferred when phenols are used.

Both the anionic and the tertiary-nitrogen catalysts of this invention have diminished activity in solvents of the chlorinated-aromatic type. These, of course, should be avoided to obtain optimum results although some bases still catalyze in such solvents. The most preferred medium is a mixture of the co-reactants themselves. At the higher temperatures of trans-acidolysis all the coreactants enumerated hereinabove will be above their melting points and the trans-acidolysis is conveniently and cheaply carried out in the melt phase. Preferably the reaction is conducted under an inert-gas blanket such as nitrogen but this precaution is not essential.

The minimum effective concentration of our catalysts has not been determined but appreciable activity can be seen at a concentration of about 0.005 mole catalyst per mole of carboxylic acid.

The following examples will illustrate the practice of the invention. Such examples are illustrative only and in no way do we intend to imply that they are co-extensive with the scope of this invention.

0.25 mole of an acylated alcohol (Table 2, below) was mixed with 0.50 mole of a carboxylic acid (table) and 0.005 mole of a catalyst of this invention (table). The mixture was placed in a 500 ml. three-necked flask equipped with a mechanical stirrer, thermometer, and Dean-Stark trap joined to a Graham condenser, and heated by a silicone oil bath. After the mixture melted, stirring was begun. Temperature was maintained as indicated (table). The reactions were terminated at various stage of completion as indicated by the formation of by-product acetic acid which was being monitored. Products were recovered from the melt by pouring the hot reaction mixture into warm acetic acid. The products crystallized, were filtered and then washed with a chlorobenzene-benzene mixture and were dried. Analyses revealed the products to be carboxylic acid esters. First-order rate constants were calculated from experimental data and are used herein as a measure of catalytic effect.

acidolysis reaction, the improvement comprising conducting the reaction in the presence of an effective amount of a tertiary amine selected from the group consisting to trihexylamine, isoquinoline, 4-phenylpyridine, acridine, triphenylamine, and trioctylamine.

TABLE 2

| Series # Example # | Acylated alcohol | Carboxylic acid [1] | Catalyst [2][6] | $k_1$ | Temp., °C. | Medium | Product |
|---|---|---|---|---|---|---|---|
| 1-3 | HDQ | TMA | None | [1] 0.0047 | 277 | Melt | Bis-Trimellitate. |
| 1-4 | HDQ | TMA | $\Phi_3$N | [1] 0.0053 | 277 | do | Do. |
| 1-5 | HDQ | TMA | Acr_g | [1] 0.19 | 277 | do | Do. |
| 1-6 | HDQ | TMA | 4-PPy | [1] 0.35 | 277 | do | Do. |
| 1-7 | HDQ | TMA | IQ | [1] 0.38 | 277 | do | Do. |
| 1-8 | HDQ | TMA | $(C_6)_3$N | [1] 1.0 | 277 | do | Do. |
| 1-9 | HDQ | TMA | NaCa | [1] 1.18 | 277 | do | Do. |
| 2-10 | HDQ | TMA | None | 0.0097 | 260 | do | Do. |
| 2-11 | HDQ | TMA | Acr | 0.0627 | 260 | do | Do. |
| 2-12 | HDQ | TMA | IQ | 0.0727 | 260 | do | Do. |
| 2-13 | HDQ | TMA | $(C_8)_3$N | 0.0822 | 260 | do | Do. |
| 2-14 | HDQ | TMA | NaAc | 0.0870 | 260 | do | Do. |
| 2-15 | HDQ | TMA | NaAc | 0.0920 | 260 | do | Do. |
| 2-16 | HDQ | TMA | KAc | 0.0990 | 260 | do | Do. |
| 2-17 | HDQ | TMA | CaAc$_2$·H$_2$O | 0.122 | 260 | do | Do. |
| 2-18 | HDQ | TMA | MgAc$_2$·4H$_2$O | 0.158 | 260 | do | Do. |
| 3-19 | HDQ | TMA | None | 0.0109 | 317 | Arochlor 1248 [5] | Do. |
| 3-20 | HDQ | TMA | $(C_8)_3$N | 0.0112 | 317 | do | Do. |
| 3-21 | HDQ | TMA | Na stear | 0.0122 | 317 | do | Do. |
| 4-22 | BP-A | TMA | None | 0.0108 | 260 | Melt | Do. |
| 4-23 | BP-A | TMA | $(C_8)_3$N | 0.0388 | 260 | do | Do. |
| 4-24 | BP-A | TMA | NaAc | 0.0392 | 260 | do | Do. |
| 4-25 | BP-A | TMA | NaAc [3] | 0.0869 | 260 | do | Do. |
| 5-26 | 4-ABP | TMA | None | 0.0166 | 270 | do | Mono-Trimellitate. |
| 5-27 | 4-ABP | TMA | $(C_8)_3$N | 0.100 | 270 | do | Do. |
| 5-28 | 4-ABP | TMA | $(C_8)_3$N[3] | 0.149 | 270 | do | Do. |
| 6-29 | 4-ABP | 2-NA | None | 0.0255 | 256 | do | Do. |
| 6-30 | 4-ABP | 2-NA | $(C_8)_3$N | 0.0274 | 256 | do | Do. |
| 6-31 | 4-ABP | 2-NA | IQ[4] | 0.0338 | 256 | do | Do. |
| 6-32 | 4-ABP | 2-NA | Na stear [4] | 0.118 | 256 | do | Do. |
| 6-33 | 4-ABP | 2-NA | NaAc[4] | 0.152 | 256 | do | Do. |
| 7-34 | 4-ABP | IPA | None | 0.0404 | 270 | do | Do. |
| 7-35 | 4-ABP | IPA | $(C_8)_3$N | 0.0441 | 270 | do | Do. |

[1] All first-order rate constants.
[2] At 0.5 mole percent based on moles of acid unless otherwise noted.
[3] 1.5 mole percent.
[4] 2.0 mole percent.
[5] T.M. of Monsanto Co. for chlorinated-biphenyls.
[6] Reactant and catalyst abbreviations: HDQ=Hydroquinone diacetate; BP-A=Biphenol-A diacetate; 4-ABP=4-Acetoxybiphenyl; TMA=Trimellitic anhydride; 2-NA=2-napthoic acid; IPA=Isophthalic acid; NaAc=Sodium acetate; $(C_6)_3$N=Trihexylamine; IQ=Isoquinoline; 4-PPy=4-phenylpyridine; Acr=Acridine; $\Phi_3$N=Triphenylamine; $(C_8)_3$N=Trioctylamine; Na stearate.

Having described our invention, we claim:

1. In the method of reacting a lower alkanoic monoester of an alcohol selected from the group consisting of n-butyl alcohol, isobutyl alcohol, sec-butyl alcohol, higher monoalkanols up to n-stearyl alcohol, the corresponding alkenols, and the corresponding thiols or a lower alkanoic polyester of a polyalcohol having the formula $$R—(Y)_n$$

where Y is —OH or —SH, $n$ is 2 to 4 and R is a phenylene radical, a fused-carbocyclic with 4 rings or less, a biphenyl, a terphenyl, a bis-phenylene, or a straight chain aliphatic radical, with trimellitic anhydride in a transacidolysis reaction, the improvement comprising conducting the reaction in the presence of an effective amount of a tertiary amine having a $pK_B$ not exceeding 10.0 and in the liquid melt phase in the absence of solvent.

2. The method of claim 1 wherein the tertiary amine is a monocyclic heterocycle having 5 to 6 ring atoms and heteroatoms selected from the group consisting of N, O, and S, said ring having at least one N-atom.

3. In the method of reacting an ester selected from the group consisting of the diacetate of hydroquinone, the diacetate of bis-phenol A, and the monoacetate of 4-acetoxybiphenyl with trimellitic anhydride in a trans- 4. The method of claim 3 wherein the ester is the diacetate of hydroquinone.

5. The method of claim 3 wherein the ester is the diacetate of bis-phenol A.

6. The method of claim 3 wherein the ester is the monoacetate of 4-acetoxybiphenyl.

References Cited
UNITED STATES PATENTS
3,471,549  10/1969  Hülsman et al. __ 260—475 PN FOREIGN PATENTS
1,181,198  11/1964  Germany _____ 260—346.3

LORAINE A. WEINBERGER, Primary Examiner
E. J. SKELLY, Assistant Examiner

U.S. Cl. X.R.
260—399, 402, 405.5, 410.6, 410.9 R, 410.9 N, 455 R, 468 R, 468 G, 469, 475 R, 475 P, 475 N, 475 SC, 475 PN, 476 R, 476 C, 479 R, 479 S, 485 R, 485 G, 485 J, 485 N, 486 R, 491

UNITED STATES PATENT OFFICE
CERTIFICATE OF CORRECTION

Patent No. 3,784,573  Dated Jan. 8, 1974

Inventor(s) Ellis K. Fields and Imre Puskas

It is certified that error appears in the above-identified patent and that said Letters Patent are hereby corrected as shown below:

Column 1, line 40, "catalysts" should be --catalysis--.
      1     41 "acidiolysis" should be --acidolysis--.
      1     51 "calcium hydroxide" omitted after "lithium hydroxide."
      2     3 "catalysts" should be --catalyst--.
      2     31 delete "," after butane.
      3     27 after "A" insert --)--.
      3     45 "alipahtic" should be --aliphatic--.
      4, Table 1, last col., "Catalyst/amount$^1$" should be --Catalyst/Amount $(3)$--.
      4     72 "stage" should be --stages--.
Table 2, 2d Col. Heading, should be --Acylated Alcohol$^{(6)}$-- super (6) omitted.
Table 2, 4th Col., 3d from top, "Acr.g" should be --Acr.--.
Table 2, 4th Col, 7th from top, "NaCa" should be --NaAc--.
Table 2, 4th Col., 13th from top, "NaAc" should be --NaAc 3 $H_2O$--.
Table 2, Footnote (6), last definition "Na Sodium stearate" should be --Na Stear - sodium stearate--.

Signed and sealed this 17th day of September 1974.

(SEAL)
Attest:

McCOY M. GIBSON JR.
Attesting Officer

C. MARSHALL DANN
Commissioner of Patents